United States Patent [19]

Ufermann

[11] 4,388,055
[45] Jun. 14, 1983

[54] MAT-FORMING APPARATUS

[75] Inventor: Werner Ufermann, Bernried, Fed. Rep. of Germany

[73] Assignee: G. Siempelkamp GmbH & Co., Krefeld, Fed. Rep. of Germany

[21] Appl. No.: 272,473

[22] Filed: Jun. 11, 1981

[30] Foreign Application Priority Data

Jun. 18, 1980 [DE] Fed. Rep. of Germany ....... 3022629
Jun. 18, 1980 [DE] Fed. Rep. of Germany ....... 3022707

[51] Int. Cl.³ ............................................. B29J 5/00
[52] U.S. Cl. .................................. 425/80.1; 264/109; 264/122; 425/83.1; 425/363
[58] Field of Search ................... 425/80.1, 81.1, 82.1, 425/83.1, 363; 264/109, 122

[56] References Cited

U.S. PATENT DOCUMENTS

| 1,901,352 | 3/1933 | McCarthy | 425/80.1 |
| 2,295,155 | 9/1942 | Brown et al. | 425/80.1 X |
| 3,864,066 | 2/1975 | Gerhardt | 425/83.1 X |
| 4,068,991 | 1/1978 | Ufermann et al. | 425/81.1 |
| 4,112,549 | 9/1978 | Min et al. | 425/83.1 X |
| 4,315,722 | 2/1982 | Ufermann | 425/83.1 |

FOREIGN PATENT DOCUMENTS

| 2523515 | 1/1976 | Fed. Rep. of Germany. | |
| 2919251 | 11/1980 | Fed. Rep. of Germany | 425/83.1 |

Primary Examiner—Philip E. Anderson
Attorney, Agent, or Firm—Karl F. Ross; Herbert Dubno

[57] ABSTRACT

A mat-forming apparatus, especially for the production of particle board, comprises a conveyor grate disposed above a layer-carrying surface, e.g. a conveyor, and below a feeder for scattering the particles onto the surface through the travelling grate. According to the invention, the lower pass of the conveyor grate is displaceable in the same direction as the receiving conveyor and is inclined upwardly away from the receiving conveyor in the direction of displacement thereof at an acute angle, this lower pass forming an inclined plane.

6 Claims, 2 Drawing Figures

MAT-FORMING APPARATUS

CROSS REFERENCE TO RELATED APPLICATIONS

The present application is related to the commonly assigned copending applications Ser. No. 098,507 filed Nov. 29, 1979 (now U.S. Pat. No. 4,315,722) and Ser. No. 155,923 filed June 3, 1980 (now U.S. Pat. No. 4,308,227). U.S. Pat. No. 4,068,991, issued Jan. 17, 1978 and also commonly assigned with the present case deals with the formation of particle-board mats as well.

FIELD OF THE INVENTION

My present invention relates to an apparatus for the formation of particle layers on a layer carrier and, more particularly, for the deposition and orientation of particles on a conveyor surface such that the particle layer can be formed into mats adapted to be pressed, e.g. in the production of particle board.

BACKGROUND OF THE INVENTION

In modern production techniques, particle board with a wide range of densities and in a variety of thicknesses may be produced for various purposes, ranging from load-carrying structural uses to insulating or decorative purposes.

The term "particle board" is here used to refer to a coherent and self-supporting product formed by the compaction of heat and pressure of a mat of particles, generally of wood, with intrinsic binder substances or with synthetic resin binders which can be added to the particles.

The particles may be wood chips so made upon comminution of the wood that they are relatively elongated and thus can be considered to have an orientation.

The particle-board mass can be pressed in single-level presses or in multiplaten presses, directly upon the platen surface or on press underlays, e.g. screens which can impart textures or patterns to the underside of the particle board.

During compression, the upper surface of the board can be embossed so as to have a particular texture and the board can be pressed to extremely high densities for use as load-supporting members or relatively low densities for use in applications in which load-bearing may not occur.

The particle board is also frequently termed composition board, and may be used directly or may be laminated to veneer or other decorative layers, can be provided with synthetic resin decorative or protective foils or can be coated depending upon the ultimate use.

In all cases, however, the precursor of a particle board is a mat, generally of rectangular configuration and a thickness which may be several times the thickness of the board into which the mat is compacted.

This mat is, at best, only loosely coherent and consists basically of a flat pile of the particles or wood chips.

It is known to form such mats by depositing the particles in a more or less uniform layer upon a receiving surface, such as a conveyor, which can carry the mats away from the layer-forming station to a station in which the layer is divided transversely to the longitudinal dimension of the layer so that discrete mats are produced.

The individual mats may be transferred directly or indirectly to the press, indirect transfer usually involving careful deposition of the mat upon a press underlay or tray which serves to carry the mat onto the press platen.

In the formation of mats or layers of particulate materials, especially wood chips, it has been found to be advantageous during the layer formation to orient the elongated particles in a transverse direction, i.e. such that the major dimension of the chips lies transverse to the conveyor movement at least predominantly.

Transverse orienters can be associated with the dispenser for depositing the particles upon the layer-forming surface.

Thus it is known to provide, for the manufacture of particle board, an apparatus or device for depositing the chips upon a continuously moving layer-forming surface, e.g. the aforementioned conveyor, which comprises a transverse orienter which moves continuously along an endless path and which has a lower portion overlying the conveyor and movable in the direction of movement of the conveyor. A dispenser for the particles is disposed above this transverse orienter.

As the layer is formed on the conveyor, the transverse flights engage the particles of the deposited mass and impart a preferential transverse orientation to the particles.

A system of this type is described in German patent document (Open Application) DA-OS 25 23 515 and is illustrated in FIG. 5 thereof.

In this system, the transverse orienter is a drum having a closed periphery and the flights project radially from this drum.

The flights thus form chambers which are bottomed by the closed periphery of the drum and which rotate about the axis thereof.

While this system has been found to be effective in large measure, it also has certain problems which can be attributed to the drum and chamber construction. For example, the resulting layer is not as uniform as is desired and the homogeneity of the transverse orientation may vary depending upon the location and the nature of the engagement of the flights with the particles.

The particle board which is formed from the mats is not isotropic in the transverse direction and there are regions in which the density may vary or other properties of the particle board may fluctuate across the board. In some cases the result is warping while in other cases weakened portions of the board can be detected.

It has been proposed to overcome these disadvantages by providing between the drum with its flights and the layer-receiving conveyor, a further roller which is intended to smooth out the layer as it is formed and in part overcome the irregularities which are inherent in the use of the pocketed drum surface formed by the flights.

While the layers resulting from this apparatus are indeed smoother and more uniform in appearance, the added roller is found to distribute the transverse orientation so that the desired particle orientation effect is not achieved and many of the problems with lack of isotropism or strength remain.

With pocketed drums of this type, when the dispenser drops particles from above onto the drum so that the drum pockets collect these particles and carry them onto the conveyor, the particles are deposited in clumps which also interfere with the uniformity of the resulting layer.

OBJECTS OF THE INVENTION

It is the principal object of the present invention to provide an apparatus for producing uniform layers of transversely oriented particles for the purposes described whereby the aforementioned disadvantages are obviated.

Another object of this invention is to provide, in a system for producing particle board of improved isotropic character and strength, an apparatus for the formation of uniform layers of transverse oriented particles which do not have the disadvantages which arise when the orientation is carried out with a drum having radial orienting flights.

Yet another object of the invention is to provide an improved and relatively simple layer-forming apparatus for the production of particle board of a high degree of uniformity and strength.

SUMMARY OF THE INVENTION

These objects and others which will become apparent hereinafter are attained, in accordance with the present invention in a layer-forming apparatus for the production of particle layers adapted to be transformed into particle board in, for example, a heated platen press, the apparatus comprising a continuously moving layer-receiving surface preferably forming the horizontal upper pass of a conveyor, a transverse orienter in the form of an endless grate having a lower pass inclined relative to the layer-receiving surface and disposed thereabove, this lower pass of the traveling grate forming the orienter diverging from the layer-receiving surface in the direction of movement thereof and being displaced in the same direction so that the downwardly extending flights of this traveling grate scoop and orient the particles as the layer is formed, and a dispenser disposed above the traveling grate and depositing (scattering) particles onto the layer-receiving surface through the upper and lower passes of the traveling grate.

Surprisingly, when the particles which are to form the layer traverse both passes of the traveling grate orienter and form the layer which is engaged by the inclined plane defined by the path of the lower edges of the flights of the grate, a highly uniform layer of true transverse orientation is formed. The effect appears to be attributable in large measure to the free fall of the particles through the orienting traveling grate onto the layer-receiving surface.

Best results are obtained when the aforementioned inclined plane, which defines a small acute angle with the layer-receiving surface, begins at a distance which is only several millimeters from this surface and runs until the spacing of this plane from the surface is equal to thickness of the layer of the mat to be produced.

The system of the present invention is thus free from chambers of the type previously described and thus there are no chambers in which the particles can collect or which can be plugged by the particles. The free fall allows the particles to achieve a transverse orientation more naturally and ridges, humps or distortions of the transverse orientation are not found in the layer.

The best results are obtained when the linear velocity of the lower pass of the grate is smaller than that of the layer-receiving surface and the layer is thus drawn out from beneath the traveling grate by the layer-receiving surface.

It has been found to be advantageous, moreover, to so dispose the flights that, along the lower pass of the traveling grate, they are inclined to the vertical, preferably downwardly and in the direction of movement of the traveling grate.

It has also been found to be advantageous to provide the traveling grate with a vibrating unit adapted to impart vibration to the flights as they travel along the inclined plane path mentioned previously.

The particle dispenser can deposit the particles in a classified or unclassified manner, i.e. with a broad spectrum of particles or with a particle size graded from fine to coarse to fine in successive layers.

The best results are obtained, however, when the dispenser includes an array of scattering disks in interdigitated relationship disposed over the horizontal span of the inclined plane mentioned previously.

In such a dispenser, the disks between which the particles fall are axially spaced apart upon respective shafts with the disks of one shaft interdigitating with the disks of shafts fore and aft thereof.

Best results are obtained in this case when substantially all of the disks are driven in the same sense and only at the ends of the array are the disks driven in opposite senses.

Classification can be effected with such disk sieves by increasing the disk spacing from shaft to shaft.

In a particularly advantageous arrangement, first fine particles, then particles of an intermediate particle size and thereafter coarse particles are deposited upon the layer-receiving surface through the traveling grate.

Of course, a reverse order of particle sizes can be used and two layer-forming units in accordance with the invention can be provided in succession or two such disk sieves can be provided for a single traveling grate arrangement, all depending upon the particle size distribution desired in the finished product. For instance, the layer can be graded to have especially fine particles at the top and bottom of the layer, a coarse particle zone in the middle of the layer and intermediate size particles between the coarse particle zone in the middle of the layer and intermediate size particles between the coarse particle zone and each fine layer.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
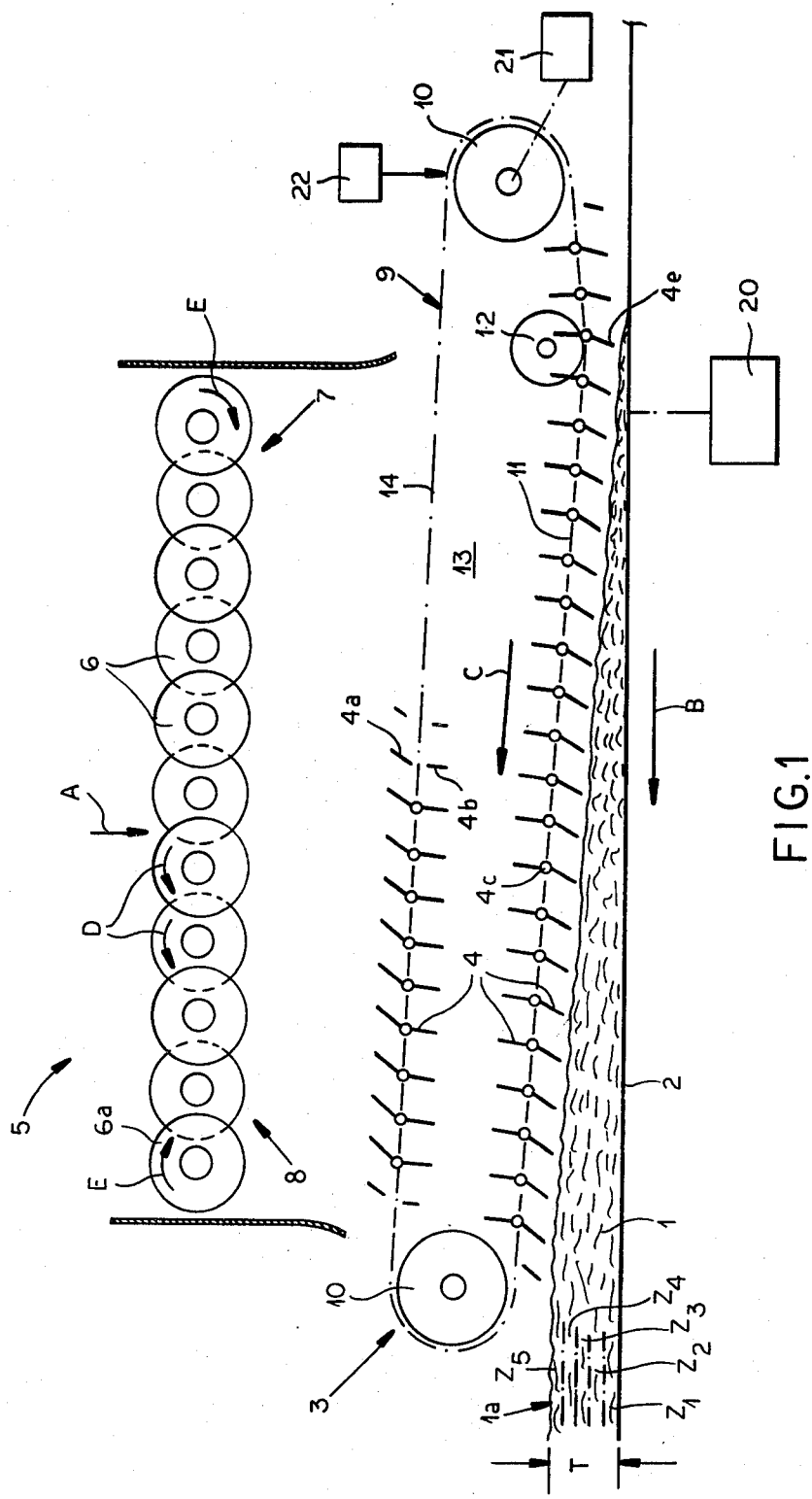
FIG. 1 is a side-elevational view of an apparatus in accordance with the invention in highly diagrammatic form.

The apparatus shown in the drawing provides a device for dispensing the particles 1, generally wood chips, upon a continuously moving layer-receiving surface 2, e.g. the upper pass of a horizontal conveyor.

The resulting layer 1a of a thickness T can be subdivided transversely into individual mats and placed upon underlays in the form of screens or trays for transportation to a platen press, e.g. a multilevel press, to be compacted with heat and pressure into particle board. The direction of the displacement of the conveyor 2 has been represented by the arrow B and the particles 1 are elongated, with a preferred orientation in the layer 1a which is transverse, i.e. perpendicular to the plane of the paper in FIG. 1.

The layer can be graded so that separate zones of particles are provided as diagrammatically represented by the zones $Z_1$, $Z_2$, $Z_3$, $Z_4$ and $Z_5$ in FIG. 1. When five such zones are formed, the zones $Z_1$ and $Z_5$ can be composed of very fine particles forming the finish surfaces of the particle board, the zones $Z_2$ and $Z_4$ can be composed of particles of an intermediate particle size, and the zone $Z_3$ can be composed of comparatively coarse particles.

The particles can previously have been coated with a thermally activatable binder or can be pressed into a coherent state using binder substances intrinsic to the wood. Alternatively, a binder in liquid form can be applied to the layer 1a.

The apparatus shown in the drawing for forming the layer 1a comprises a transverse orienter represented generally at 3 and a dispenser 5 disposed above this orienter for scattering the particles 1 onto the receiving surface 2.

The transverse orienter, according to the invention, comprises a traveling grate whose flights 4 extend transversely, i.e. across the width of the conveyor 2, and are pivotally mounted on endless stretches 9 of chain or belt passing over wheels 10 at opposite ends of the traveling grate.

Each flight 4 can have an outer blade 4a and an inner blade 4b spaced on opposite sides of the respective pivot 4c and positioned so that, over the lower pass 11 of the traveling grate, the blades 4a are inclined downwardly and forwardly in the direction of travel C of the lower pass of the traveling grate which is in the same general direction B of movement of the surface 2. However, the linear speed of the lower pass of the traveling grate is less than that of the conveyor 2 which can be provided with a drive means represented at 20. The traveling grate can have a drive 21. The blades 4b can be slotted at 4d to clear the wheels 10 and a wheel 12 which defines the lower end of an inclined plane pass for the lower edges 4e of the blades 4a. This inclined plane pass begins, at its right-hand end, only a few millimeters above the surface 2 and increases to substantially the distance T from the layer 2 at its extreme left-hand end.

The dispenser 5 is provided over the full horizontal span of this inclined plane.

The dispenser 5 is here formed as a disk screen, comprising a multiplicity of disks 6 which are all driven in the same sense, i.e. as represented by the arrows D, except for the disks 6a at the ends of the array which can be driven in the opposite sense as represented by arrows E.

Figure 2:
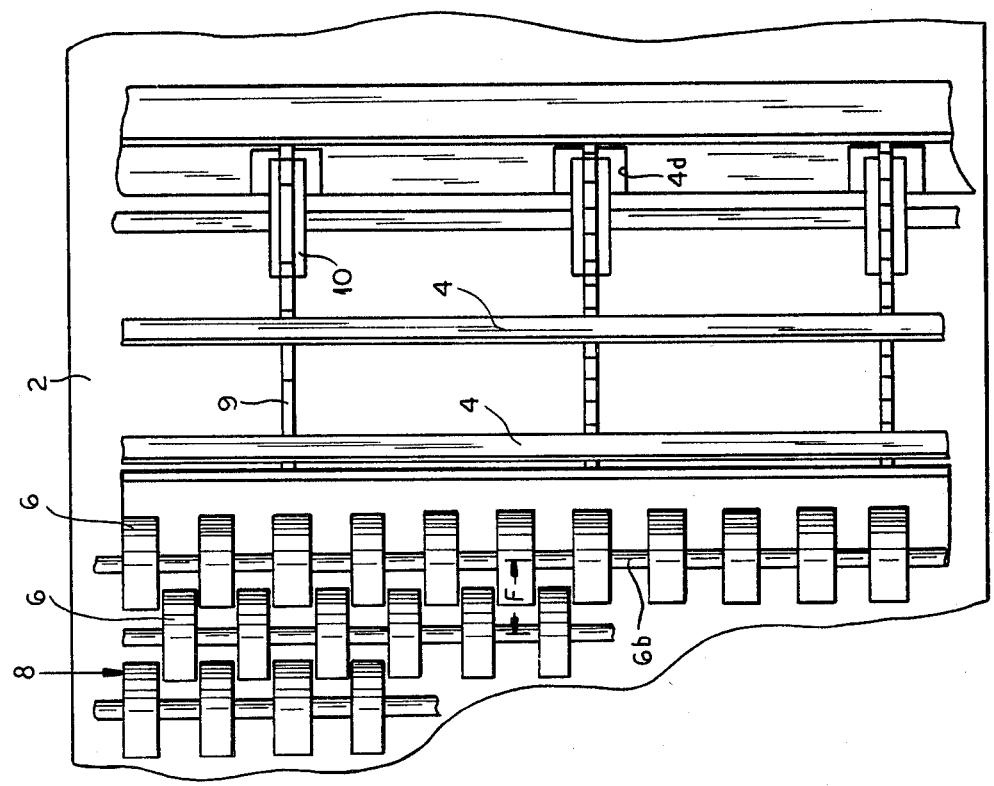
FIG. 2 is a plan view of a portion of this apparatus.

The disks 6 are carried on shafts 6b and interdigitate as shown in FIG. 2. The intershaft spacing F may vary across the array so that relatively small gaps are formed in the region 8 thereby grading the particles so that a fine layer is deposited first and a coarse layer is deposited subsequently.

Since the flights 4 form bars of a grate, the particles 1 can pass in free fall through the upper pass and then the lower pass of the traveling grade onto the surface so as to be guided into the transverse orientation in a highly uniform manner. The wheels 12 can be adjusted to vary the angle of the inclined plane and the tension on the traveling grade conveyor. The lower pass of the traveling grate can converge toward the region at which the diverging inclined plane begins and it has been found to be advantageous to provide the traveling grate with a vibrator 22 which appears to further increase the uniformity of the layer produced.

I claim:

1. An apparatus for forming a layer of transversely oriented particles, especially for the production of particle board, said apparatus comprising:
   a continuously movable layer-receiving surface;
   a pair of roller members spaced apart along said surface in the direction of movement thereof;
   an endless traveling grate disposed above said surface and looped around said roller members said traveling grate having a lower pass moving generally in the direction of movement of said surface, said traveling grate having flights extending transverse to the direction of movement of said surface and adapted to orient particles deposited thereon, said flights being spaced apart in said direction whereby particles can fall through the passes of said grate between said roller members, said flights having lower edges which define an inclined plane path along a lower pass of said traveling grate diverging from said surface in the direction of movement of said lower pass; and
   a dispenser for said particles disposed above said traveling grate and substantially extending over the length thereof for depositing particles on said surface through the upper and lower passes of said traveling grate between said roller members.

2. The apparatus defined in claim 1, further comprising means for driving said surface and said traveling grate so that the linear velocity of said lower pass is less than that of said surface.

3. The apparatus defined in claim 1 or claim 2 wherein each of said flights is inclined downwardly and upwardly from the vertical in the direction of displacement of said lower pass.

4. The apparatus defined in claim 3, further comprising a vibrator connected to said traveling grate for vibrating same.

5. The apparatus defined in claim 3 wherein said dispenser comprises a disk sieve formed by rows of interdigitated disks in an array extending over the horizontal span of said inclined plane.

6. The apparatus defined in claim 5 wherein said disk is constructed and arranged to classify said particles and initially deposit particles of one particle size prior to depositing particles of another size in said layer.

* * * * *